United States Patent
Lepley et al.

(10) Patent No.: US 12,546,279 B2
(45) Date of Patent: Feb. 10, 2026

(54) ADAPTIVE SPARK ENERGY CONTROL

(71) Applicant: Altronic LLC, Girard, OH (US)

(72) Inventors: David Lepley, Cortland, OH (US); Matthew Traina, Ravenna, OH (US); Aaron Phifer, Girard, OH (US); Gary Kleinfelder, Girard, OH (US)

(73) Assignee: Altronic LLC, Girard, OH (US)

( * ) Notice: Subject to any disclaimer, the term of this patent is extended or adjusted under 35 U.S.C. 154(b) by 0 days.

(21) Appl. No.: 18/938,659

(22) Filed: Nov. 6, 2024

(65) Prior Publication Data

US 2025/0146465 A1 May 8, 2025

Related U.S. Application Data

(60) Provisional application No. 63/596,715, filed on Nov. 7, 2023.

(51) Int. Cl.
*F02P 3/045* (2006.01)
*F02P 3/05* (2006.01)
*H01F 38/12* (2006.01)

(52) U.S. Cl.
CPC .............. *F02P 3/045* (2013.01); *F02P 3/05* (2013.01); *H01F 38/12* (2013.01)

(58) Field of Classification Search
CPC .. F02P 3/045; F02P 3/05; F02P 3/0846; F02P 9/002; F02P 2017/121; F02B 43/10; H01F 38/12
See application file for complete search history.

(56) References Cited

U.S. PATENT DOCUMENTS

| | | | |
|---|---|---|---|
| 7,401,603 B1* | 7/2008 | Lepley | F02P 3/0846 123/620 |
| 10,233,891 B1* | 3/2019 | Rezaei | F02P 17/10 |
| 12,173,678 B2* | 12/2024 | Alriksson | F02P 3/0435 |
| 2013/0076362 A1* | 3/2013 | Steinrueck | G01L 23/221 324/382 |

* cited by examiner

*Primary Examiner* — Grant Moubry
(74) *Attorney, Agent, or Firm* — GREENBLUM & BERNSTEIN, P.L.C.

(57) ABSTRACT

A system and method for operating an ignition system. An ignition transformer has primary and secondary windings. A spark apparatus is connected with the secondary windings of the ignition transformer. One or more characteristics of a spark generated by the spark apparatus is provided. An electronic control unit is adapted to control the ignition transformer, such that, based on an identification of the spark using the one or more characteristics and the spark reference data, the electronic control unit sends control signals to the ignition transformer to modify the one or more characteristics of the spark. Modification of the one or more characteristics may occur in a same spark cycle as measurement of the one or more characteristics.

20 Claims, 3 Drawing Sheets

ADAPTIVE SPARK ENERGY CONTROL

FIELD

The present teachings relate generally to power electronics and, more particularly, to ignition systems that may be used with combustion engines.

BACKGROUND

In general, an ignition system generates a high voltage that is sent to a spark plug to create a spark, as is appreciated by one skilled in the art. The spark in turn ignites a fuel-air mixture in an engine's combustion chamber(s) to drive the engine. The ignition coil (also referred to as ignition transformer) typically produces the high voltage. U.S. Pat. No. 7,401,603, entitled "High tension capacitive discharge ignition with reinforcing triggering pulses", discloses an ignition system and is incorporated by reference in its entirety.

Known ignition systems use open-loop control, meaning that they do not use feedback in control of the spark. Such systems may suffer from undesirable drawbacks due to open-loop decision making. For example, known systems may be one or more engine rotations behind in their appreciation of the spark characteristics and so cannot make a change even for the next firing event in order to optimize the spark for a particular application.

Closed-loop control means that there is feedback information that is fed back to a controller of a system. As set forth below, observing characteristics of a spark (e.g., in the same spark cycle) and adjusting that spark may be desirable to optimize the spark for particular applications.

Therefore, it would be beneficial to have an alternative system and method for adaptive spark energy control.

SUMMARY

The needs set forth herein as well as further and other needs and advantages are addressed by the present embodiments, which illustrate solutions and advantages described below.

One embodiment of a system according to the present teachings includes, but is not limited to, an ignition system. It includes an ignition assembly having an ignition transformer with primary and secondary windings and electronics including one or more characteristics of a spark (e.g., could have a sensor or could receive and store data from another source) generated by a spark apparatus connected with the secondary windings. A datastore has spark reference data. A control unit is adapted to send control signals to the electronics to modify the one or more characteristics of the spark based on an identification of the spark using the one or more characteristics and the spark reference data.

In one embodiment, the identification includes both a position of the spark as well as a type of the spark.

In one embodiment, modification of the one or more characteristics occurs in a same spark cycle as measurement of the one or more characteristics.

In one embodiment, the one or more characteristics comprise at least one of a primary current, a secondary current, a secondary voltage, a spark placement, and a combustion.

In one embodiment, the control signals control a spark current and/or a spark duration in a closed-loop manner.

In one embodiment, the spark reference data comprises spark models, and a spark model is selected from the spark models based on the one or more characteristics. The control unit provides for model-based control of an engine using the spark model.

One embodiment of a system according to the present teachings includes, but is not limited to, an engine system. It includes an engine having a cylinder, an ignition system according to the present teachings, and a spark apparatus adapted to generate a spark at the cylinder.

In one embodiment, the engine comprises a hydrogen fuel engine.

In one embodiment, the spark apparatus comprises a spark plug.

In one embodiment, the one or more characteristics comprise secondary current and/or secondary voltage.

In one embodiment, the datastore is in the ignition assembly.

One embodiment of a system according to the present teachings includes, but is not limited to, an ignition controller. A datastore has spark reference data. A control unit is adapted to be in electronic communication with an ignition assembly having electronics including one or more characteristics of a spark generated by a spark apparatus. The control unit is adapted to send control signals to the electronics to modify the one or more characteristics of the spark based on an identification of the spark using the one or more characteristics and the spark reference data.

In one embodiment, the identification includes both a position of the spark as well as a type of the spark.

In one embodiment, modification of the one or more characteristics occurs in a same spark cycle as measurement of the one or more characteristics.

In one embodiment, the one or more characteristics comprise secondary current and/or secondary voltage. The control signals control a spark current and/or a spark duration.

In one embodiment, the system comprises a plurality of sensors that measure a plurality of characteristics of the spark.

In one embodiment, the electronic control unit identifies a signature of the spark for model-based control of an engine.

In one embodiment, the comparison of the spark reference data and the one or more characteristics is performed by the control unit.

One embodiment of a system according to the present teachings includes, but is not limited to, an engine ignition system. It includes an engine with (at least one) cylinder, and an ignition controller according to the present teachings.

In one embodiment, the control signals control a spark current and/or a spark duration in a closed-loop manner.

One embodiment of a method according to the present teachings includes, but is not limited to, a method for controlling a spark in an ignition system. An ignition transformer is provided for generating the spark. A control unit is provided for controlling the ignition transformer. One or more characteristics of the spark is compared with desired characteristics. Control of the ignition transformer is adjusted to change the spark for the desired characteristics.

Other embodiments of the system and method are described in detail below and are also part of the present teachings.

For a better understanding of the present embodiments, together with other and further aspects thereof, reference is made to the accompanying drawings and detailed description, and its scope will be pointed out in the appended claims.

DETAILED DESCRIPTION

Figure 1:
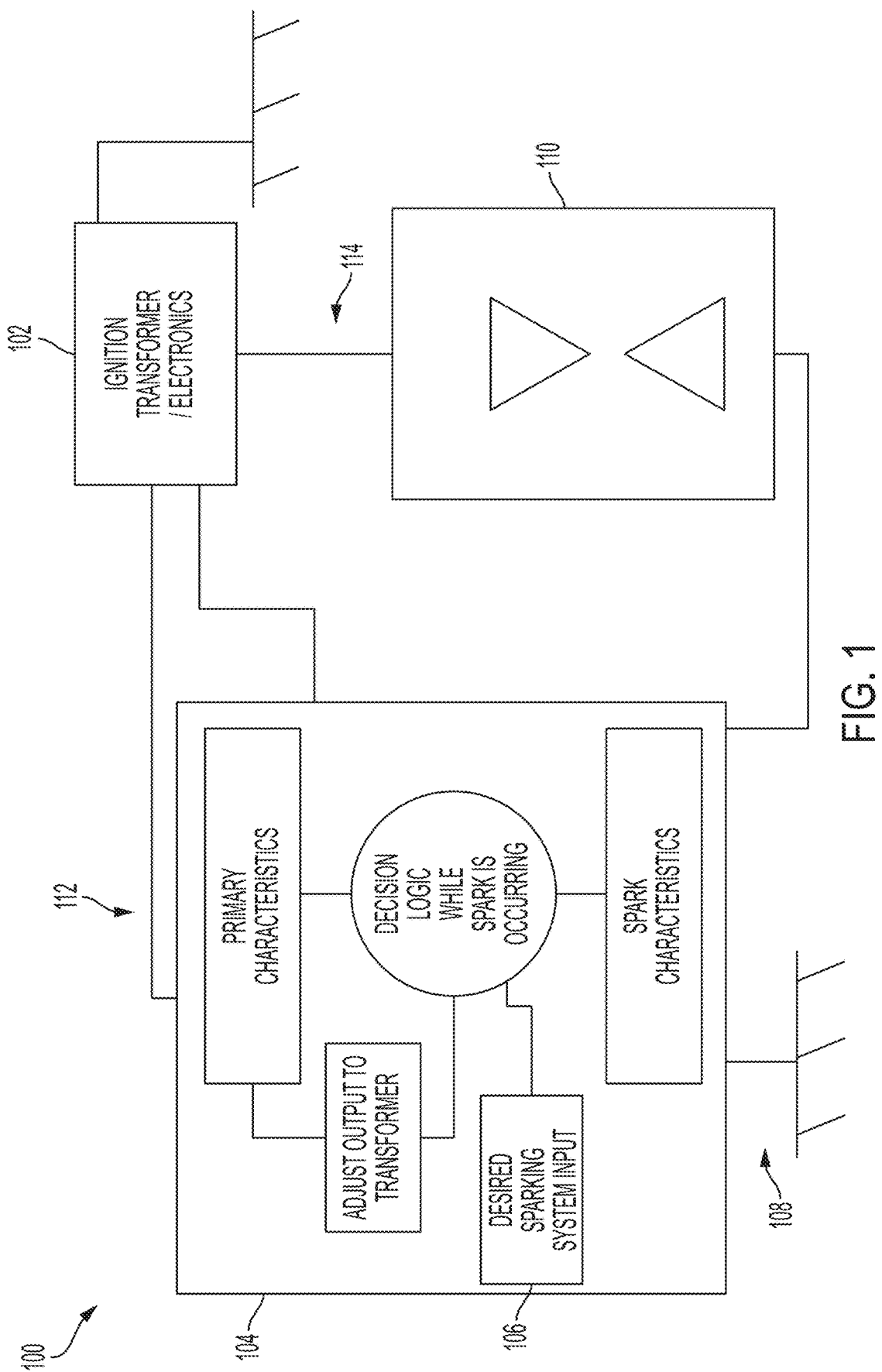
FIG. 1 is an illustration of one embodiment of a system according to the present teachings.

The present teachings are described more fully hereinafter with reference to the accompanying drawings, in which the present embodiments are shown. The following description is presented for illustrative purposes only and the present teachings should not be limited to these embodiments. Any computer configuration and architecture satisfying the speed and interface requirements herein described may be suitable for implementing the system and method of the present embodiments.

In compliance with the statute, the present teachings have been described in language more or less specific as to structural and methodical features. It is to be understood, however, that the present teachings are not limited to the specific features shown and described, since the systems and methods herein disclosed comprise preferred forms of putting the present teachings into effect.

For purposes of explanation and not limitation, specific details are set forth such as particular architectures, interfaces, techniques, etc., in order to provide a thorough understanding. In other instances, detailed descriptions of well-known devices, circuits, and methods are omitted so as not to obscure the description with unnecessary detail.

A "computing system" may provide functionality for the present teachings. The computing system may include software executing on computer readable media that may be logically (but not necessarily physically) identified for particular functionality (e.g., functional modules). The computing system may include any number of computers/processors, which may communicate with each other over a network. The computing system may be in electronic communication with a datastore (e.g., database) that stores control and data information. Forms of computer readable media include, but are not limited to, disks, hard drives, random access memory, programmable read only memory, or any other medium from which a computer can read.

Generally, all terms used in the claims are to be interpreted according to their ordinary meaning in the technical field, unless explicitly defined otherwise herein. All references to a/an/the element, apparatus, component, means, step, etc., are to be interpreted openly as referring to at least one instance of the element, apparatus, component, step, etc., unless explicitly stated otherwise. The steps of any method disclosed herein do not have to be performed in the exact order disclosed, unless explicitly stated. The use of "first", "second," etc. for different features/components of the present disclosure are only intended to distinguish the features/components from other similar features/components and not to impart any order or hierarchy to the features/components.

To aid the Patent Office and any readers of a patent issued on this application in interpreting the claims appended hereto, it is noted that none of the appended claims or claim elements are intended to invoke 35 U.S.C. 112(f) unless the words "means for" or "step for" are explicitly used in the particular claim.

Recitations of numerical ranges by endpoints include all numbers within that range (e.g., 1 to 5 includes 1, 1.5, 2, 2.75, 3, 3.80, 4, 5, etc.). Where a range of values is "greater than", "less than", etc., of a particular value, that value is included within the range. Any direction referred to herein, such as "top," "bottom," "left," "right," "upper," "lower," "above," below," and other directions and orientations are described herein for clarity in reference to the figures and are not to be limiting of an actual device or system or use of the device or system. Many of the devices, articles, or systems described herein may be used in a number of directions and orientations.

Any citation to a reference in this disclosure or during the prosecution thereof is made out of an abundance of caution. No citation (whether in an Information Disclosure Statement or otherwise) should be construed as an admission that the cited reference qualifies as prior art or comes from an area that is analogous or directly applicable to the present teachings.

The present teachings include adaptive, in spark cycle measurement, and characteristic changing for a spark. In one embodiment, characteristics of a spark are observed from an apparatus making the spark (e.g., spark plug). Then, it is determined where and what type of spark is being created. In this way, during the same spark event it is possible to change the characteristics of the spark, including anything that manipulates the energy content, although not limited thereto.

The identification of the spark, such as its type, location, etc., can be determined based on spark characteristics, such as spark voltage and current, although not limited thereto. As is appreciated by one skilled in the art, there are many spark characteristics as well as applications for the present teachings for determining information about a spark using mathematical functions on feedback (e.g., spark characteristics) and cylinder characteristics. As an example, one may use a calculus function on the electrical characteristics of the spark to determine whether the spark is at the beginning or end of the gap.

As a non-limiting example of the types of calculations that can be performed in accordance with the present teachings, the integral of the KV signal can be analyzed (e.g., algorithmically) to look at slope changes. This can be used to differentiate slopes and tell if a spark started at the beginning or end of the spark plug electrodes, how fast it is moving, etc. More integral may indicate a spark starting at the end of the electrodes and less integral may indicate a spark starting at the beginning of the electrodes. This in turn gives an indication of whether more or less energy is needed for the spark. Pushing too much energy when it is not needed could lead to hot spots in a spark plug and pre-ignite a volatile mixture. Not enough energy when the electrodes are absorbing energy (heat from the spark) means that the mixture might not combust. Accordingly, the integral and slopes could be used to reduce plug wear and provide other benefits. One skilled in the art appreciates the various calculations that could be performed in accordance with the present teachings.

Known systems may only try to control a spark (with current) based on a set point. However, such systems lack intelligence of what the energy content is actually doing. For example, setting a set point of X current and then maintaining it may be too much or not enough energy based on the type of spark that was created. Such a system that relies on current control can only ever keep the spark's arc going, but has no idea if it is too much or too little for whatever arc was created in order to meet the needs of the combustion.

In accordance with the present teachings, the spark can be controlled with greater accuracy and provide greater efficiency. This is because, for example, the type of spark can be identified. With this information it is possible to modify control of the spark (e.g., changing a current set point, etc.)

to maintain energy for a cylinder. As an example, if the spark is positioned towards the end of the electrodes, it would need less energy to combust the air/gas mixture than if it started at the beginning of the electrodes. Identifying the spark, such as its position and type, permits the ability to better control the spark.

There are a number of reasons the present teachings have not been pursued before. For example, combustion with traditional fuel sources (e.g., natural gas, gasoline) have a higher detonation tolerance (abnormal combustion) and slower and less volatile flame speed. However, new fuel sources (such as hydrogen, etc.) present issues, such that it is desirable to get as close to 0 degrees of variation as possible. In addition, inductive ignition systems, which have been used mainly for automotive applications, have been too slow to deploy this type of technology. Moreover, understanding actual characteristics of a spark and what is happening may not be intuitive based on the arc acting like a diode. More current can be added and the voltage drop may generally stay the same. Similarly, if the KV goes up external facing current may not go down at the same rate. Therefore it can be a difficult task and there has not been motivation to solve such problems in known systems.

In accordance with the present teachings, it may be desirable to change the delivery of a spark in a closed-loop manner such that the exact spark fits the needs of a system. This way, it can provide neither more nor less of the desired characteristics but is instead optimized for a particular application. This may have a direct effect on any sparking system, including such things as electrode wear, heat release, spark temperature, ionization break down, etc., as is appreciated by one skilled in the art.

In one embodiment, a system according to the present teachings is implemented using a computing system (e.g., processor) and/or hardware (e.g., analog). It may be desirable to use analog hardware for speed, such that complex math functions and measurements (e.g., non-linear) may be calculated and converted to digital outputs that can be read by the system. Once physical hardware provides math functions to the computing system (e.g., a micro controller), the computing system can process those such that it can identify the type of spark. Following that, a unique approach to creating spark pulses can be done in a closed-loop way to provide precise spark characteristics, such as energy, although not limited thereto. There may be a measuring time for a first part of the spark, and a characteristic adjustment period following the measurement.

Advantages of such a system include a direct effect on several items pertaining to a sparking system. For example, these may include electrode wear, heat release, spark temperature, ionization break down, etc. It advances the functionality and capabilities of engines and other pieces of equipment that use a sparking apparatus alongside any type of burning fuel. For example, advancements can be seen in normal natural gas operation, as well as new fuels such as hydrogen, although not limited thereto.

Referring now to FIG. 1, shown is an illustration of one embodiment of a system 100 according to the present teachings. An ignition assembly 102 (e.g., ignition coil/transformer, data storage, electronics, etc.) may provide energy to a sparking mechanism 110 (e.g., spark plug) so that a spark can be generated for the ignition system, as is appreciated by one skilled in the art. This may be via a secondary coil path 114.

The ignition assembly 102 may include electronics (e.g., processor, one or more characteristics of the spark, one or more sensors, stored reference data, etc.) for identifying high voltage, low voltage, and voltage manipulation, although not limited thereto. This may specifically include voltage sensors.

The control logic 104 (e.g., central control unit, control circuit, etc.) may send electronic signals to drive the primary of the ignition transformer in the ignition assembly 102. Various wires 112 may be used for exchanging data signals between control logic 104 and ignition assembly 102, as is appreciated by one skilled in the art. Control logic 104 (e.g., driver electronics) may include capabilities for sensing currents and voltages as well as for performing math functions, although not limited thereto.

The control logic 104 may send control signals generally timed with a combustion event (or some degrees before or after a cylinder tops dead center). Electrical characteristics (e.g., currents/voltages/etc.) may be sensed anywhere at the point of load, meaning they can be sensed locally with circuits that have enough integrity and minimize loss of degradation. One skilled in the art appreciates where and how to sense electrical characteristics of the primary and/or secondary, including voltage and current.

Desired sparking system input 106 may include things such as the desired primary current, secondary current, spark placement, secondary voltage, combustion, and any combination thereof, although not limited thereto. One skilled in the art appreciates the different characteristics that may be used in accordance with the present teachings. The input 106 may include data that corresponds with or can be transformed to correspond with the type of feedback. This may come from modeling, testing, experimentation, etc., to get desired engine results, although not limited thereto.

Primary and secondary electronics 108 may be tied together or left isolated, depending on application. For example, it may be desirable to get signal integrity, although not limited thereto.

The system may include a datastore (e.g., database) that may store data such as spark reference models (e.g., signatures), spark reference characteristics, desired characteristic ranges, etc., as is appreciated by one skilled in the art. For example, measured spark characteristics may be compared to reference data in the datastore to identify the spark, although not limited thereto. The datastore (and other functionality) may be in electronic communication with a network (e.g., the Internet) so that reference data may be updated (wired or wirelessly), although not limited thereto. The reference data may be stored in tables, databases, or other forms, as desired and appreciated by one skilled in the art. This may allow for further validation of the system as well as for artificial intelligence (AI) to teach and transform operation of the system with better predictability.

In one exemplary use according to the present teachings, electrical characteristics of a spark's arc may be measured. This may include spark current (e.g., secondary current) and spark voltage, although not limited thereto. Various attributes of these signals may be measured, such as peak, average, derivative, integral, etc. There are many different ways in electronics to perform such measurements, as is appreciated by one skilled in the art.

Such measurements may provide a "signature" of the spark between the sparkplug electrodes. This signature can directly offer insight to things like flow velocity between the electrode gap and can be used in conjunction with a model-based control to predict various operating scenarios of the engine. In this way, an ignition system can be tailored for a specific engine and specific operating conditions to increase efficiency.

Based on such predictions the spark current or spark duration can be adjusted, although not limited thereto. Adjusting the spark characteristics based on the measured conditions allows for greater control of engine combustion phasing, as an example.

Figure 2:
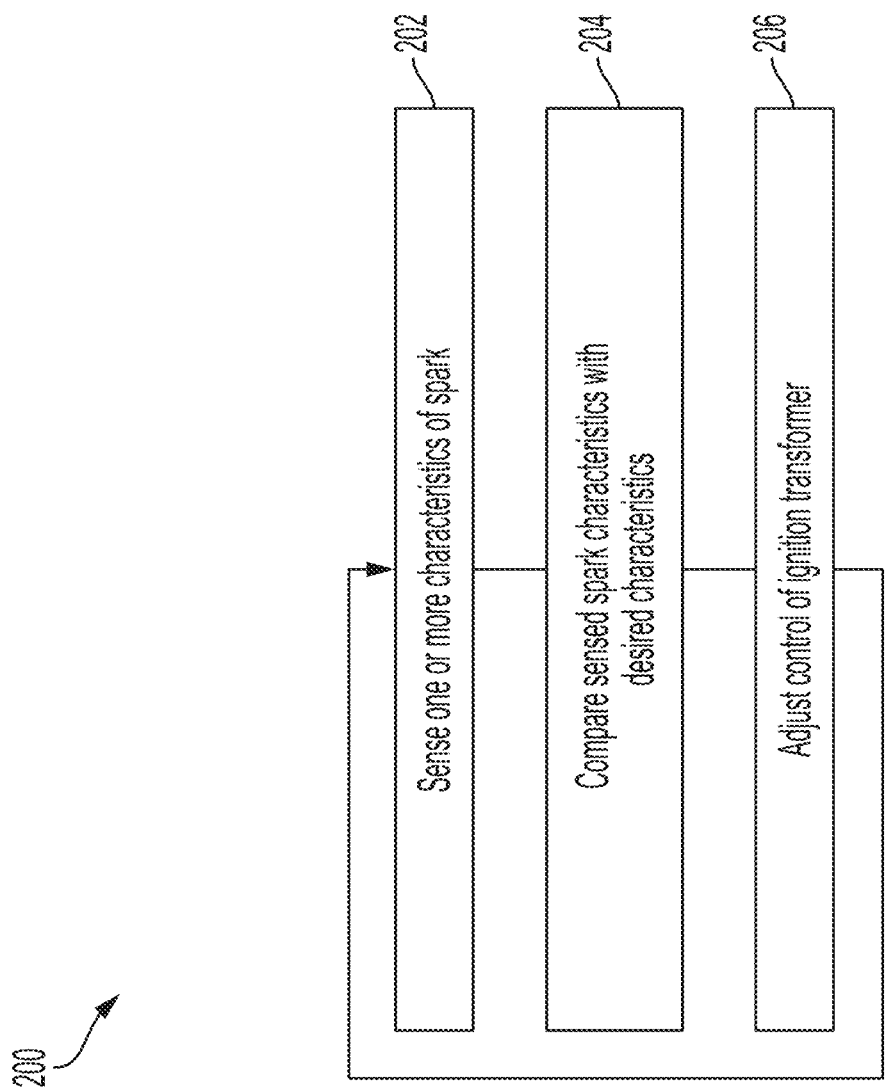
FIG. 2 is an illustration of one embodiment of a method according to the present teachings.

Referring now to FIG. 2, shown is an illustration of one embodiment of a method 200 according to the present teachings. One or more characteristics of a spark may be sensed 202. The sensed characteristics may be compared with desired characteristics 204 (e.g., to identify the spark, to identify the most preferable spark, etc.). Control of the ignition transformer may be adjusted 206 to change the spark for desired characteristics.

Figure 3:
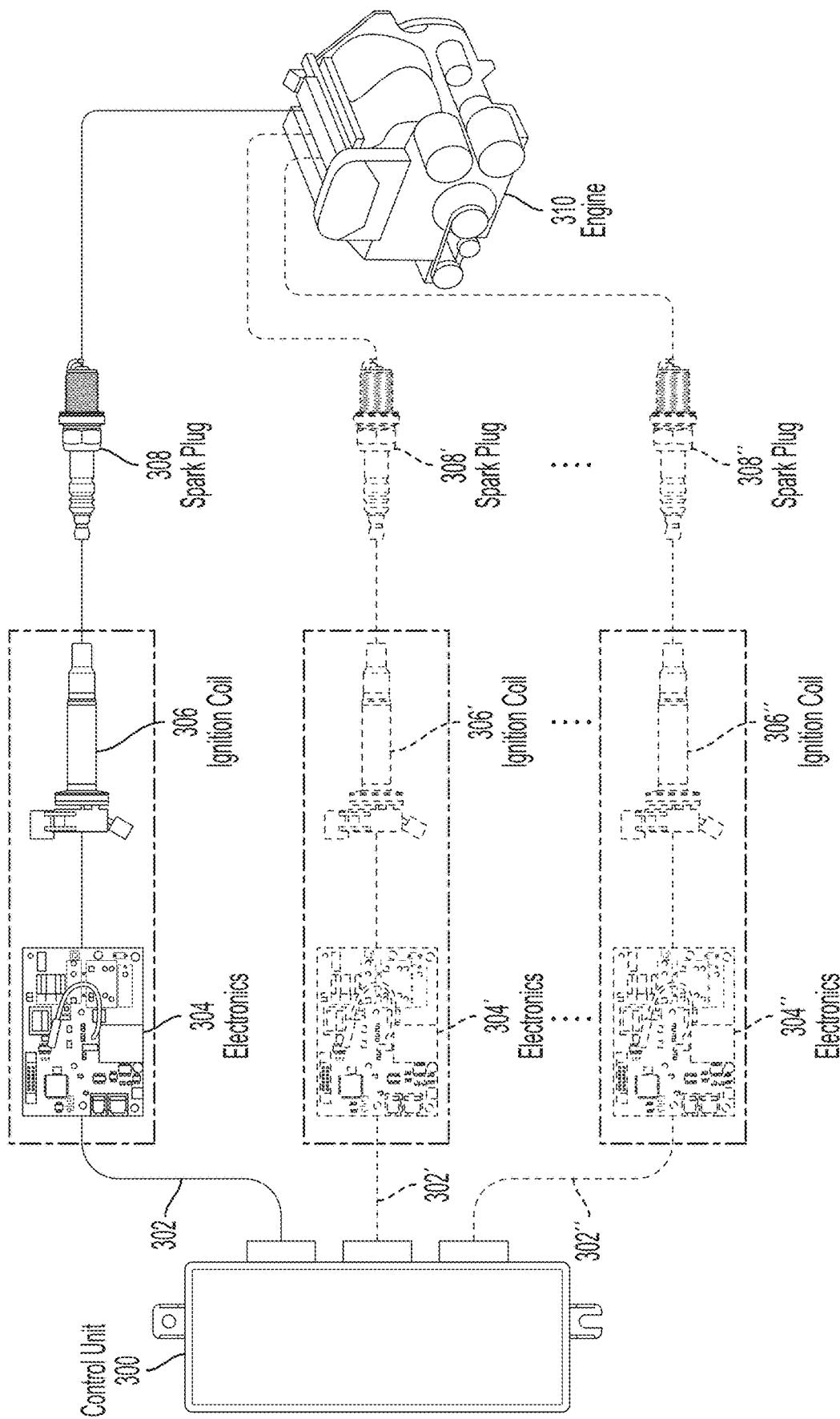
FIG. 3 is an illustration of the embodiments of FIGS. 1 and 2 in an engine control system.

Referring now to FIG. 3, shown is an illustration of the embodiments of FIGS. 1 and 2 in an engine control system. As shown, a control unit 300 may be in electronic communication with one or more ignition control assemblies 304, 306. Each assembly may include electronics 304 (e.g., spark characteristics, a sensor, data storage, etc.) and an ignition coil 306. Communication between the central control unit 301 and electronics 304, 304', 304" may be performed over one or more communication links 302, 302', 302". Each assembly may send energy to a spark plug 308, 308', 308". The spark plugs may in turn drive crankshafts in an engine 310 (e.g., one or more spark plugs in each engine cylinder), as is appreciated by one skilled it the art.

While the present teachings have been described above in terms of specific embodiments, it is to be understood that they are not limited to these disclosed embodiments. Many modifications and other embodiments will come to mind to those skilled in the art to which this pertains, and which are intended to be and are covered by this disclosure. It is intended that the scope of the present teachings should be determined by proper interpretation and construction of its legal equivalents, as understood by those of skill in the art relying upon the disclosure in this specification and the attached drawings.

What is claimed is:

1. An ignition system, comprising:
   an ignition assembly having:
   an ignition transformer with primary and secondary windings;
   electronics including one or more characteristics of a spark generated by a spark apparatus connected with the secondary windings;
   a datastore having spark reference data;
   a control unit adapted to send control signals to the electronics to modify the one or more characteristics of the spark based on an identification of the spark using the one or more characteristics and the spark reference data.

2. The system of claim 1, wherein the identification includes a position of the spark as well as a type of the spark.

3. The system of claim 1, wherein modification of the one or more characteristics occurs in a same spark cycle as measurement of the one or more characteristics.

4. The system of claim 1, wherein the one or more characteristics comprises at least one of a primary current, a secondary current, a secondary voltage, a spark placement, and a combustion.

5. The system of claim 1, wherein the control signals control a spark current and/or a spark duration in a closed-loop manner.

6. The system of claim 1, wherein:
   the spark reference data comprises spark models, and a spark model is selected from the spark models based on the one or more characteristics;
   the control unit provides for model-based control of an engine using the spark model.

7. The system of claim 1, further comprising a plurality of sensors that measure a plurality of characteristics of the spark.

8. An engine system, comprising:
   an engine having a cylinder;
   the ignition system of claim 1;
   a spark apparatus adapted to generate a spark at the cylinder.

9. The system of claim 8, wherein the engine comprises a hydrogen fuel engine.

10. The system of claim 8, wherein the spark apparatus comprises a spark plug.

11. The system of claim 8, wherein the one or more characteristics comprises secondary current and/or secondary voltage.

12. The system of claim 1, wherein the datastore is in the ignition assembly.

13. An ignition controller, comprising:
    a datastore having spark reference data;
    a control unit adapted to be in electronic communication with an ignition assembly having electronics including one or more characteristics of a spark generated by a spark apparatus;
    the control unit adapted to send control signals to the electronics to modify the one or more characteristics of the spark based on an identification of the spark using the one or more characteristics and the spark reference data.

14. The controller of claim 13, wherein the identification includes a position of the spark as well as a type of the spark.

15. The controller of claim 13, wherein modification of the one or more characteristics occurs in a same spark cycle as measurement of the one or more characteristics.

16. The controller of claim 13, wherein:
    the one or more characteristics comprises secondary current and/or secondary voltage;
    the control signals control a spark current and/or a spark duration.

17. The controller of claim 13, wherein the electronic control unit identifies a signature of the spark for model-based control of an engine.

18. The controller of claim 13, wherein the comparison of the spark reference data and the one or more characteristics is performed by the control unit.

19. An engine ignition system, comprising:
    an engine having a cylinder;
    an ignition controller of claim 13.

20. The system of claim 19, wherein the control signals control a spark current and/or a spark duration in a closed-loop manner.

* * * * *